(12) United States Patent
Sharma et al.

(10) Patent No.: US 7,461,349 B1
(45) Date of Patent: Dec. 2, 2008

(54) METHODS AND APPARATUS FOR APPLYING FUNCTIONS TO CONTENT

(75) Inventors: Raman Sharma, Gurgaon Haryana (IN); Niraj Gupta, Faridabad Haryana (IN)

(73) Assignee: Adobe Systems Incorporated, San Jose, CA (US)

( * ) Notice: Subject to any disclaimer, the term of this patent is extended or adjusted under 35 U.S.C. 154(b) by 466 days.

(21) Appl. No.: 11/364,664

(22) Filed: Feb. 28, 2006

(51) Int. Cl.
*G06F 3/048* (2006.01)
*G06F 3/14* (2006.01)

(52) U.S. Cl. .................. 715/770; 715/788; 715/864; 715/781

(58) Field of Classification Search ................. None
See application file for complete search history.

(56) References Cited

U.S. PATENT DOCUMENTS

| | | | | |
|---|---|---|---|---|
| 5,237,647 | A * | 8/1993 | Roberts et al. | 345/419 |
| 5,600,781 | A * | 2/1997 | Root et al. | 715/745 |
| 6,773,177 | B2 * | 8/2004 | Denoue et al. | 400/88 |
| 7,176,888 | B2 * | 2/2007 | Marvit et al. | 345/156 |

2006/0265653 A1 * 11/2006 Paasonen et al. ............ 715/704

OTHER PUBLICATIONS

Adobe Creative Team. "Adobe Acrobat 7.0 Classroom in a Book." Pub Date: Feb. 21, 2005.*

* cited by examiner

*Primary Examiner*—Doug Hutton
*Assistant Examiner*—Soumya Dasgupta
(74) *Attorney, Agent, or Firm*—Chapin IP Law, LLC; Barry W. Chapin, Esq.

(57) ABSTRACT

An editor application receives a selection of content made with a selection tool such as a computer mouse. The editor application monitors one or more motion attributes (e.g., direction, speed, etc.) associated with the selection tool during the selection of content. During a respective operation (e.g., pasting) of the selected content, the editor application takes into account the one or more motion attributes associated with the selection tool when initiating a paste function with respect to the selected content. That is, the one or more motion attributes observed during the selection of content dictate (at least in part) how editor application will use the selected content. For example, a user can select text from right-to-left. During a respective copy and paste operation, because the text was selected in reverse order, the editor application reverses an ordering of how the characters appear in the pasted text.

23 Claims, 7 Drawing Sheets

METHODS AND APPARATUS FOR APPLYING FUNCTIONS TO CONTENT

BACKGROUND

Use of text editors and the like has become quite common in conventional computer applications. One reason for such a broad acceptance of text editors is the convenience afforded by their use. For example, via use of a window-based application such as a text editor, a computer user can open a "window" on a computer screen and modify the contents of a file such as a text-based document. Typically, text editors enable a user to select text in a document and thereafter apply text editing or formatting commands such as bolding, italicizing, underlining, copying, pasting, formatting, etc.

In general, operations can include three steps such as i) Select, ii) Copy, and iii) Paste. A select operation is limited to marking the content for future operation. Copy is a type of future operations that can be applied to a selection. A paste operation works only if you have previously copied content.

As discussed above, one type of command supported by most text editors is a so-called respective cut and paste function. For example, a user can control a computer mouse to select a grouping of text displayed in the text editor. During such an operation, a respective computer system executing the editor application can execute a command to store a copy of the selected text in a buffer. Upon initiation of a paste command by the user, the computer system inserts a copy of the selected text in the buffer to a location in a document as specified by the user.

Most text editors enable a user to select text (e.g., initiate a copy command) in both a forward or reverse direction. For example, using a computer mouse device, a user can place a pointer (such as a cursor) at the beginning of a text string, initiate a start copy command, and scan the pointer towards the right hand side of the screen to the end of a respective text string that is to be copied. While the pointer is located at the end of the text string, the user initiates an end copy command. Clicking of the mouse and scanning from left to right causes the text editor to copy the selected text string into a buffer.

Alternatively, the computer user can scan from a character located at a right side of a display screen and scan towards the left. For example, the user can use the mouse to scan from the end of a sentence to the beginning of the sentence to select respective text for copying in the buffer. In either of the above cases, whether selecting text based on left-to-right or right-to-left scanning motions, the computer to stores the same data associated with the selected text in a temporary storage buffer. Upon initiation of a respective paste command, the computer displays a copy of the sentence in the same order (e.g., from start of the sentence to the end of the sentence or from left to right) no matter which way the computer user selected the original sentence.

Other conventional cut and paste application operate in a similar way. For example, photo editors enable a respective user to select a portion of an image based on: moving a pointer to a first boundary of a selection region, clicking a mouse to start a selection process, scanning the mouse so that the respective pointer moves to a second boundary of the selection region, and clicking the mouse again to end the selection process. A rectangular area formed by a diagonally opposed first boundary and second boundary indicates the selected region to be copied to a temporary buffer.

SUMMARY

Conventional editors that enable selection of content on a respective display screen suffer from a number of deficiencies. For example, conventional editors enable a user to select, copy, and paste content as described above. However, a user must initiate an additional set of separate commands if the user wishes to manipulate how the copied content appears after the respective paste operation. For example, a user may initiate an additional set of separate commands after the paste process to modify aspects of the pasted matter. This can include flipping, rotating, highlighting, labeling, etc. aspects of the pasted content so that the newly pasted content appears in a desired way. A user could actually perform these operations just by selecting content and invoking one of these commands. Typically, the above commands require that the user select options from respective one or more pull-down menus after pasting an original copy of the selected content. Applying these extra commands to the pasted content as separate user initiated processing steps can be quite time-consuming.

Techniques discussed herein deviate with respect to conventional applications such as those discussed above as well as additional techniques also known in the prior art. In particular, embodiments herein are directed to an editor application that monitors motion attributes of a selection tool (e.g., a computer input device, such as a computer mouse, a trackpad, stylus, touch screen, etc.) or a user's movements such as movement of a user's hand or body during selection of content. Thereafter, during a paste operation, the editor application pastes the copied contents to a respective display medium depending on the motion attributes observed during selection of the content. In one embodiment, the editor application herein can utilize the motion attributes (e.g., direction of scanning the selection tool, speed of scanning the selection tool, etc.) to modify how the pasted content appears on a respective display medium. Accordingly, embodiments herein include a system, apparatus, and method for displaying a visual representation of selected content (e.g., images, text, symbols, pictures, etc.) depending on attributes detected during a selection operation. According to one embodiment herein, a selection operation makes a copy of the content. Selection of content is distinguished from copying content. Also, techniques herein can be applied to different types of content such as audio, video, photos, etc.

More specifically, according to one embodiment herein, an editor application receives a selection of content made with a selection tool such as a handheld computer mouse. The editor application includes a respective monitor function to monitor one or more motion attributes associated with the selection tool during the selection of content. During a respective operation (e.g., "pasting") applied to the selected content, the editor application takes into account the one or more motion attributes (e.g., direction, speed, etc.) associated with the selection tool when initiating a paste function with respect to the selected content. That is, the one or more motion attributes observed during the selection of content dictate (at least in part) how the selected content will appear after execution of a respective paste function.

In one embodiment, the editor application herein applies a post processing display function to the selected content for purposes of modifying an appearance associated with the pasted content. As discussed above, application of the post-processing display function varies depending on observed motion attributes during the selection process. For example, the post processing display function uses the observed motions associated with a computer mouse as a command-like input indicating how to modify a copy of the selected content during the paste command. Accordingly, application of the post processing function and how a pasted version of the selected content appears on a respective display medium varies depending on the one or more detected attributes associated with the selection tool during the selection of content.

Additional embodiments herein include a computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment herein. This latter embodiment provides a way of monitoring unique motion of attributes of a user and/or corresponding compute mouse to identify how to paste selected content on a display medium.

Yet other embodiments herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present application is directed to a computer program product that includes a computer readable medium having instructions stored thereon for supporting an editor application according to embodiments herein. The instructions, when carried out by a processor of a respective computer device, cause the processor to perform the steps of: i) receiving a selection of content made with a selection tool; ii) monitoring at least one motion attribute associated with the selection tool during the selection of content; and iii) applying a post processing function to the selection of content, application of the post processing function varying depending on the at least one motion attribute of the selection tool during the selection of content. Other embodiments of the present application include software programs to perform any of the method embodiment steps and operations summarized above and disclosed in detail below.

As discussed above, techniques herein are well suited editor applications that support selection and paste type of operations in a respective editor application. However, it should be noted that embodiments herein are not limited to use in such applications and that the techniques discussed herein are well suited for other applications as well.

It is to be understood that the system according to an embodiment herein can be embodied strictly as a software program, as software and hardware, or as hardware alone such as within a processor, or within an operating system or a within a software application. Example embodiments of the invention may be implemented within products and/or software applications manufactured by Adobe Systems, Inc. of San Jose, Calif., USA. Additional features of the embodiments herein will be further discussed in the Detailed Description section of this application and accompanying figures.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to an example embodiment, an editor application receives a selection of content made with a selection device or selection tool such as a handheld computer mouse. The editor application includes a respective monitor function to monitor one or more motion attributes (e.g., direction, speed, etc.) associated with the selection device during the selection of content. Thereafter, during a respective "pasting" of selected content, the editor application takes into account the one or more motion attributes associated with the selection device when initiating a paste function with respect to the selected content. That is, the one or more motion attributes observed during the selection of content dictate (at least in part) how editor application will paste the selected content.

In one embodiment, a user selects text from right-to-left. During a respective paste operation, because the text was selected in reverse order (for English/Roman based text) from right-to-left, the editor application reverses an ordering of how the characters appear in the pasted text. Note also that embodiments herein can be applied to ideographic languages such as Chinese, in which symbols are read from top to bottom. Also, note embodiments herein can be applied to Arabic languages that appear in order from right to left, which is opposite to an ordering of characters in the English language. Accordingly, techniques herein are directed to applying a display function to depending on observed movements (i.e., motion attributes) of a respective selection tool (e.g., computer mouse, cursor on a display screen, selection device, etc.). These and other additional features are discussed in more detail below with accompanying figures.

Figure 1:
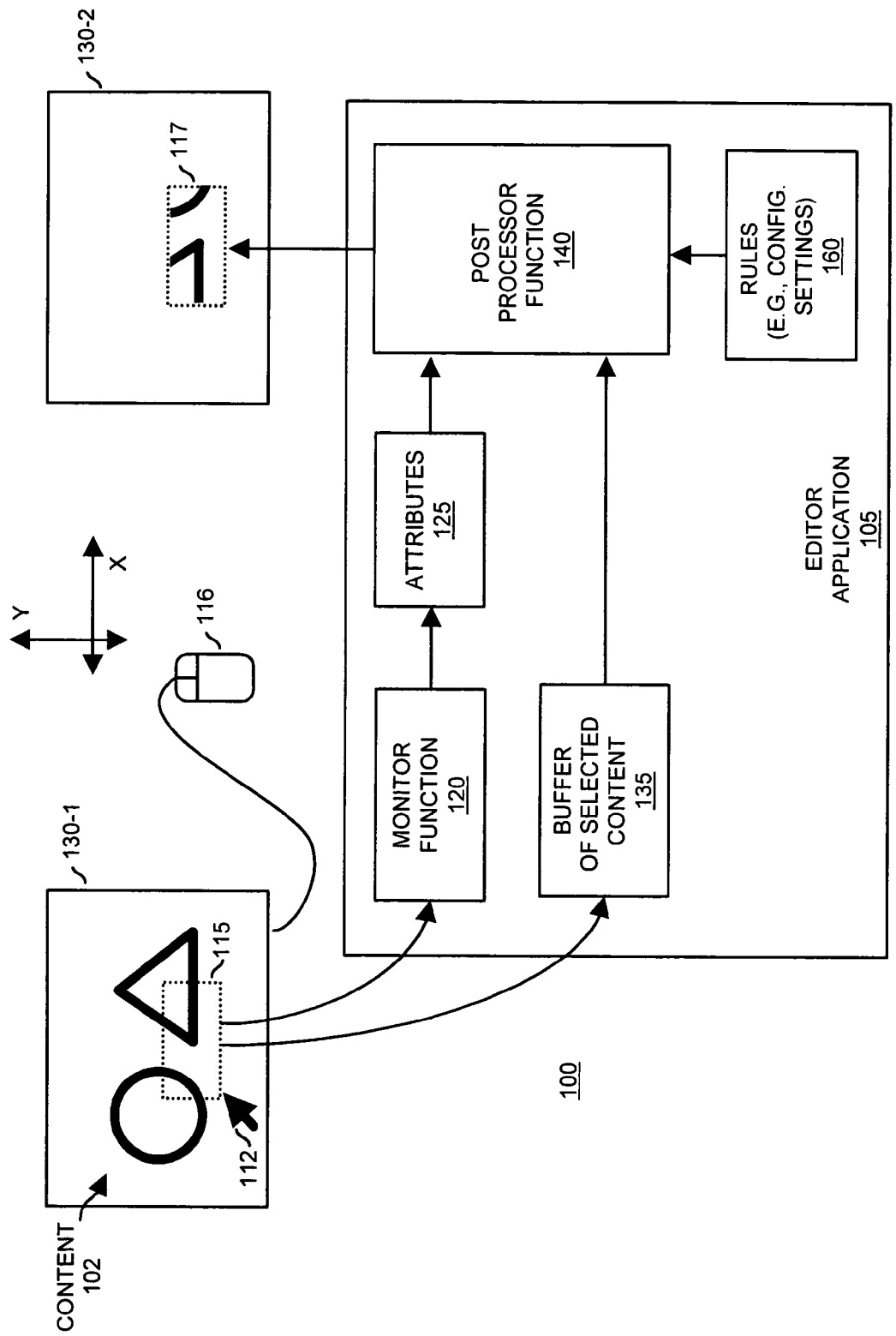
FIG. 1 is a diagram of a computer environment including an editor application according to an embodiment herein.

FIG. 1 is a diagram of a computer environment 100 supporting an editor application 105 according to an embodiment herein. As shown, computer environment 100 includes editor application 105 and corresponding display medium 130-1 and display medium 130-2 (collectively, display medium 130) such as a single or separate display screen that displays content 102 and pasted content 117. The content 102 on display medium 130 can include matter such as images, characters, shapes, pictures, etc. that can be edited by a respective user operating selection tool 116. Selection tool 116 (e.g., a computer mouse) in computer environment 100 controls movement of arrow 112 (e.g., a cursor, pointer, etc.) on display medium 130 for purposes of carrying out cut and paste type operations according to embodiments herein.

Editor application 105 includes monitor function 120, attributes 125, buffer 135 of selected content shown in display region 115, post processor function 140, and rules 160. A combination of these resources carries out editing functions according to embodiments herein. For example, a user can initiate movement of selection tool 116 to move arrow 112 on display medium 130. Based on operations such as clicking a control button on selection tool 116, scanning arrow 112 in the display medium 130, and un-clicking the control button on selection tool 116, the user is able to specify display region 115 as selected content. In this way, editor application 105 enables the user to initiate copying of the selected content in display region 115 to buffer 135 for further processing.

More specifically, during a process of selecting content 102 from display medium 130-1 in the context of the present example, monitor function 120 of editor application 105 monitors selection tool 116, arrow 112 (e.g., cursor, prompt, pointer, visual aid, etc.), or any other human or machine-like input to computer environment 100 that is used to carry out or affect an operation of selecting and/or pasting portions of content 102 on display medium 130. For example, in one embodiment, monitor function 120 monitors a direction or sweeping motion (e.g., a motion attribute) associated with arrow 112 (i.e., selection tool 116 or the like) during a selection with respect to content 102. In another embodiment, monitor function 120 monitors one or more attributes such as a speed of the selection tool 116 during the selection process. In yet another embodiment, the monitor function 120 monitors one or more attributes such as relative locations on display medium 130-1 where the selection occurs at different times during the selection process. As will be further discussed herein, the monitored attributes associated with a respective user as applied to the selection tool 116 (or other resource) dictates at least in part how to paste selected content.

In general, monitor function 120 can be programmed to monitor any type or types of attributes associated with the selection process. Accordingly, selection attributes monitored or identified by monitor function 120 can vary depending on the application.

As discussed above, one purpose of the editor application 105 is to enable a respective user to select and, thereafter, paste the selected content in display region 115 as pasted content in display region 117 of display medium 130-2. Post processor function 140 uses the detected attributes (e.g., motion attributes) associated with selection tool 116 (or other monitored resource) for purposes of identifying how the selected content stored in buffer 135 will appear when pasted on display medium 130-1 as pasted content in display region 117.

In one embodiment, note that rules 160 (e.g., user configuration settings) can affect how post processor function 140 utilizes detected attributes 125 to modify how pasted content appears in display region 117 of display medium 130-2. In other words, a respective user can program the post processor function 140 to paste selected content depending on how the user programs respective configuration settings.

In the context of the present example, a user has selected a portion of a respective circle and triangle as shown by display region 115 on display medium 130-1. Assume that during the selection process, that the user starts a selection by moving arrow 112 to the top right corner of display region 115 and sweeps the arrow 112 to the bottom left corner of display region 115. As discussed above, buffer 135 stores the selected content in display region 115. Monitor function 120 detects the right-to-left and/or top-to-bottom sweeping motion associated with selection tool 116 during the selection process.

According to one embodiment herein, the post processor function 140 performs a respective paste operation based on a direction of the sweeping motion. That is, post processor function 140 carries out a respective paste operation by pasting the first selected portion of content first and the last portion of selected content last during a respective paste operation. Thus, in the context of the present example shown in FIG. 1, post processor function 140 pastes the selected content so that the selected content appears flipped about a y-axis with respect to how the selected content appears in its original form. Note again that conventional applications orient newly pasted content with the same orientation as the original selected content regardless of a direction of making a selection. Embodiments herein utilize the direction of the selection tool to identify how to perform a respective paste operation. Thus, according to one embodiment herein, the direction of sweeping associated with the selection tool 116 provides a command-like input to the post processor function 140 as to how to present, orient, or modify the original selected content in display region 117 during a paste operation.

Note that the operation applied to the selected content can vary depending on a respective embodiment. For example, motion attributes detected during a respective selection process can be used to apply functions such as filtering to the selected content. The amount or type of filtering applied to the selected content can vary depending on the detected motion attributes detected during the selection process. Note also that the above example can be extended to other types of selections of content as well. For example, a user can initiate selection of audio or video data or images and apply different function to a respective selection depending on motion attributes detected during the respective selection.

Figure 2:
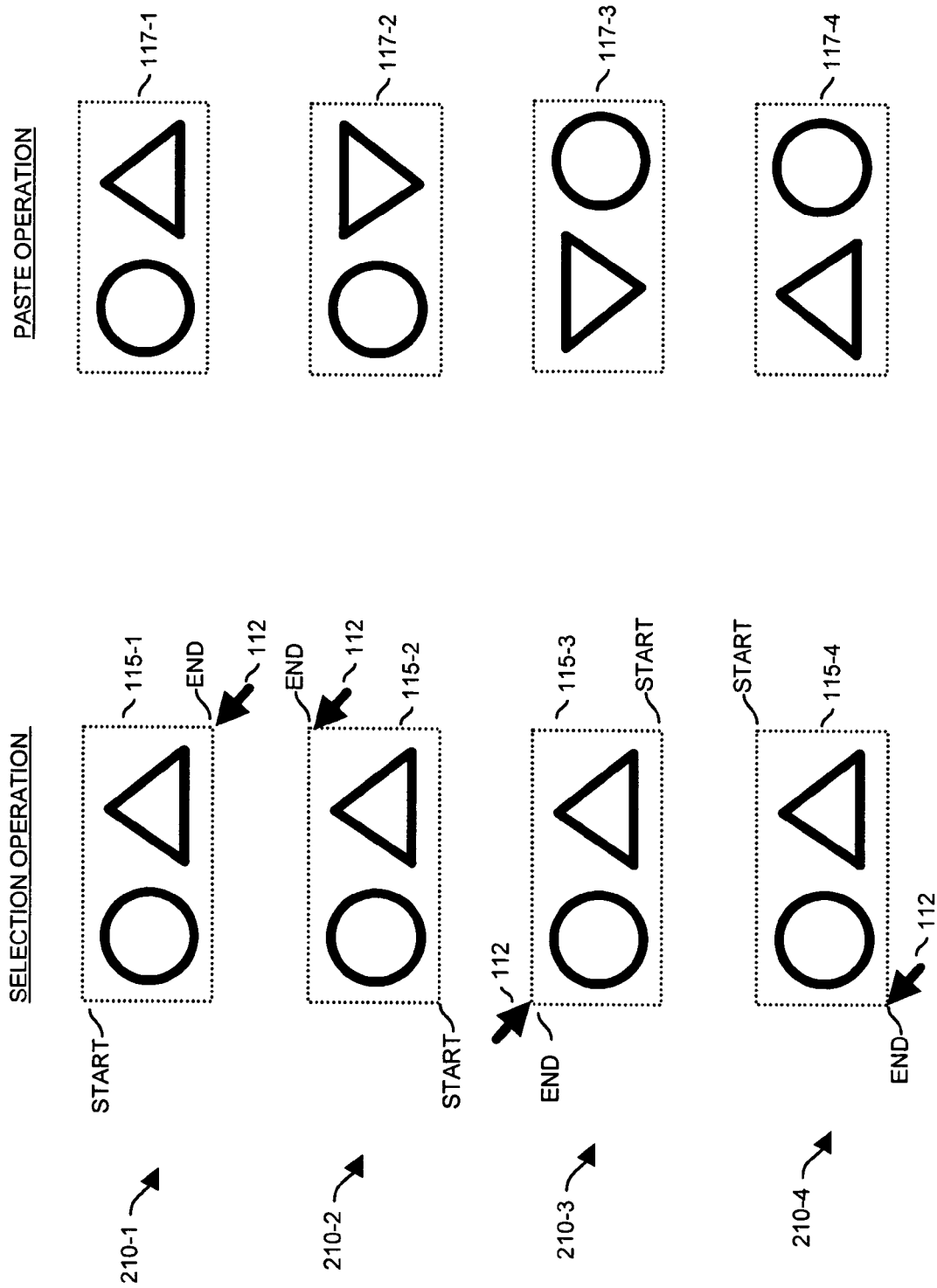
FIG. 2 is a diagram illustrating selections of content and corresponding paste operations according to embodiments herein.

FIG. 2 is a diagram illustrating editor application 105 displays selected content differently depending on a direction attribute associated with selection tool 116 during selection of content according to an embodiment herein.

In the first example 210-1, a respective user (or other input) initiates a selection of content in display region 115-1 as a left-to-right and top-to-bottom motion of arrow 112. In the present example, assume that editor application 105 performs respective paste operations according to a direction of arrow 112 during the selection process. For example, assume that post processor function 140 carries out a respective paste operation by pasting the first selected portion of content first and the last portion of selected content last. As shown in example 210-1, because arrow 112 was swept from left-to-right and top-to-bottom during the selection process, editor application 105 initiates a display of the selected content as the selected content appeared in its original form. In other words, the selected content in display region 115-1 appears identical in orientation to the pasted content in display region 117-1.

In the second example 210-2, a respective user (or other input) initiates a selection of content in display region 115-2 as a left-to-right and bottom-to-top motion of arrow 112. As shown in example 210-2, because arrow 112 was swept from left-to-right and bottom-to-top during the selection process, editor application 105 initiates a display of the selected content upside down with respect to how the selected content appeared in its original form in display region 115-2. In other words, the selected content in display region 115-2 appears to be flipped about a respective x-axis when producing pasted content in display region 117-2.

In the third example 210-3, a respective user (or other input) initiates a selection of content in display region 115-3 as a right-to-left and bottom-to-top scanning motion of arrow 112. As shown in example 210-3, because arrow 112 was swept from right-to-left and bottom-to-top during the selection process, editor application 105 initiates a display of the selected content upside down and flipped with respect to how the selected content appeared in its original form in display region 115-3. In other words, the selected content in display region 115-3 appears to be flipped about a respective x-axis (e.g., a horizontal axis) and flipped about a respective y-axis (e.g., a vertical axis) when producing pasted content in display region 117-3.

In the fourth example 210-4, a respective user (or other input) initiates a selection of content in display region 115-4 as a right-to-left and top-to-bottom motion of arrow 112. As shown in example 210-4, because arrow 112 was swept from right-to-left and top-to-bottom during the selection process, editor application 105 initiates a display of the selected content as flipped with respect to how the selected content appeared in its original form in display region 115-4. In other words, the selected content in display region 115-4 appears to be flipped about a respective y-axis when producing pasted content in display region 117-4.

In one embodiment, the user can configure the editor application 105 to ignore a direction associated with top-to-bottom or bottom-to-top motion attributes but instead initiate paste operations depending on only right-to-left and left-to-right motion of the selection tool during the selection process. For example, embodiments herein include a post processor function 140 that obtains information stored in buffer 135 associated with a portion of an image selected on a display screen. The editor application 105 and, more specifically, the post processor function 140 causes the visual representation of the selection of content to be oriented on the respective display medium 130 in a same manner as the portion of the image originally appeared on the display screen if the direction of the selection tool was from left-to-right during the selection of the content. Conversely, the editor application 105 and, more specifically, the post processor function 140 causes the visual representation of the selection of content to be reoriented on the respective display medium 130-2 as flipped about a vertical axis with respect to how the portion of image originally appeared on the display screen if the direction of the selection tool was from right to left during the selection of the content. In other words, according to one embodiment when the up-down direction is ignored, both of the selection operations shown in example 210-1 and example 210-2 would produce pasted content as shown in display region 117-1. In such an embodiment, both of the selection operations shown in example 210-3 and example 210-4 would produce pasted content as shown in display region 117-4.

The above example illustrates that the paste operation can vary depending on a direction of the selection tool 116 during the selection process. As discussed above, note again that a respective speed of the selection tool 116 can affect how editor application 105 initiates display of the selected content during a paste operation.

In one embodiment, the editor application "blurs" or "shades" a respective pasted image different amounts depending on how fast the user moves the selection tool 116 during the selection process. For example, the editor application 105 can detect how fast respective contents are selected during the selection process and blur, shade, or apply some other customized function to the pasted content more for content that was selected quickly and less for content selected more slowly. Of course, a respective user can configure or customize rules 160 so that editor application 105 appropriately modifies how selected content appears after a paste operation according to the other types of user preferences.

Figure 3:
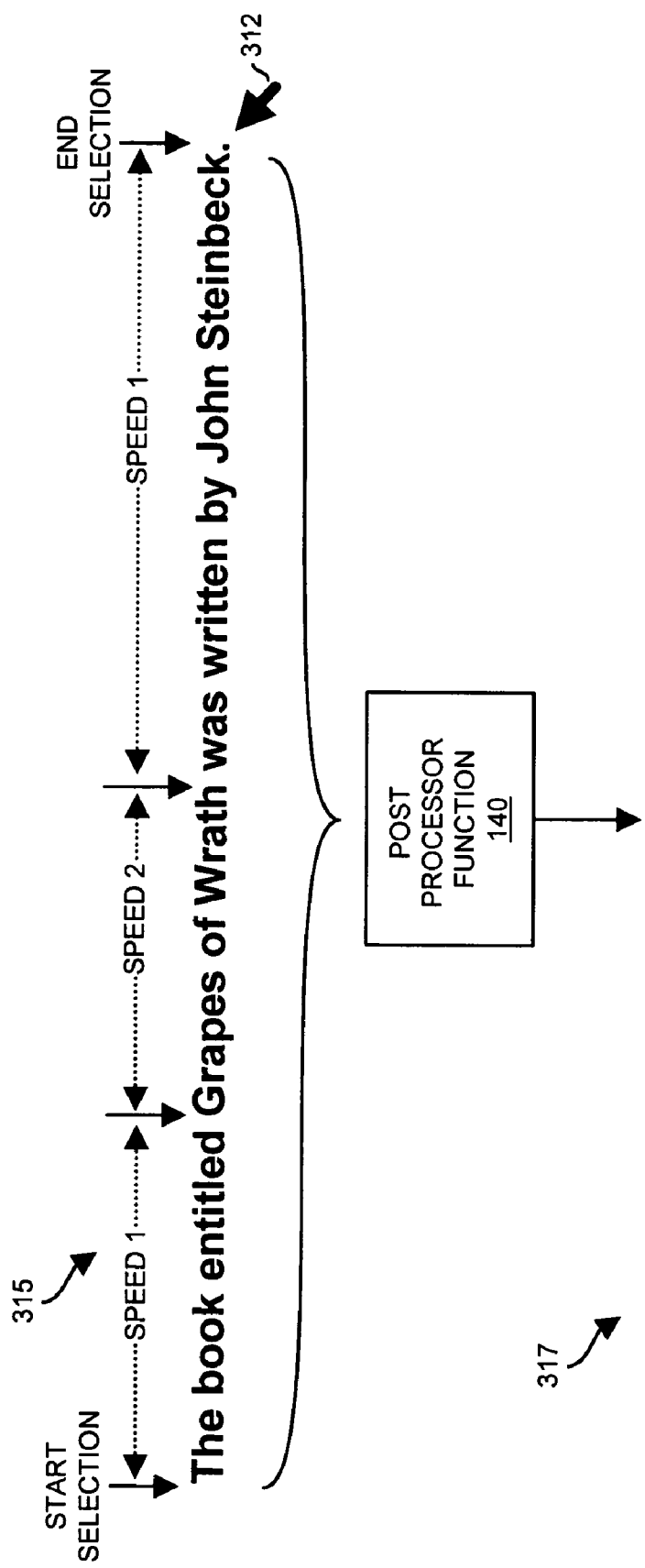
FIG. 3 is a diagram illustrating how speed of a respective selection tool during a selection process can impact how respective content appears after a paste operation according to an embodiment herein.

FIG. 3 is a diagram illustrating how the editor application 105 can operate on selected symbols (e.g., text characters) of a character string 315 according to an embodiment herein. However, assume for this example that the editor application 105 utilizes a relative speed associated with the selection tool 116 to identify how to perform a respective paste operation with respect to selected content.

For example, assume that a respective user sweeps arrow 312 from the beginning to end of a respective character string 315 (e.g., a sentence) at different speeds such as a relatively fast speed when corresponding text should be pasted without modification and a relatively slow speed for text that should be underlined during a respective single paste operation.

More specifically, when selecting the text "The book entitled," the user operates a respective selection tool 116 at a scan rate of approximately speed 1. When selecting text "Grapes of Wrath" during the selection process, the user slows down a rate of sweeping or scanning the respective selection tool 116 to approximately speed 2. Finally, when selecting the text "was written by John Steinbeck," the user speeds up a rate of sweeping or scanning selection tool 116 to a scan rate of approximately speed 1 again. As discussed above, monitor function 120 monitors the speeds and stores such information as attributes 125. Post processor function 140 utilizes attributes 125 to identify how to display respective selected text during a paste operation.

During the respective paste operation, the editor application 105 applies the post processing function 140 to the selection of content in order to display a visual representation of the selection of content. The post processor function 140 causes the selection of content to be displayed differently (e.g., underlining slowly selected content) on a respective display medium depending on the respective speed of the selection tool 116 during the selection of content. For example, according to one embodiment, the post processor function 140 receives the selection of content from buffer 135 and obtains attributes 125 information associated identifying the speed of the selection tool 116 during the selection process.

Application of the post processor function 140 in this example involves i) applying a first display function (e.g., simply pasting selected content as it originally appeared) to at least one portion of the selection of content in which the respective speed (e.g., speed 1) of the selection tool falls within a first range during the selection of the content, and ii) applying a second display function (e.g., underlining selected text) to at least one portion of the selection of content in which the respective speed (e.g., speed 2) of the selection tool falls within a second range during the selection of the content. Accordingly, in this example, post processor function 140 produces character string 317 including an underline of the character string "Grapes of Wrath" during a respective pasting of selected character string 315.

Figure 4:
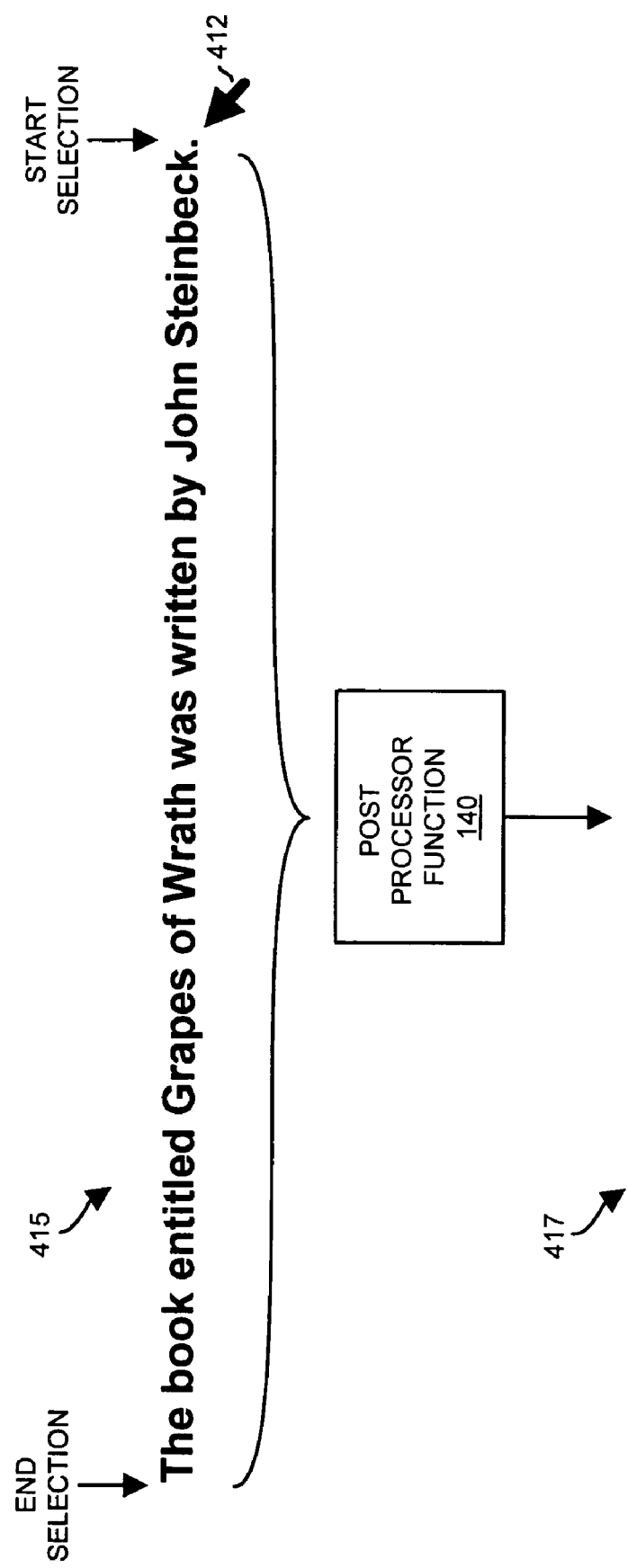
FIG. 4 is a diagram illustrating how a direction of selecting content impacts how selected content appears after a paste operation according to an embodiment herein.

FIG. 4 is a diagram illustrating a technique of initiating paste operations based on detected motion attributes according to an embodiment herein. For example, an editor application 105 receives a selection of multiple characters displayed on a respective display screen during a selection process. A post processing function 140 of the editor application 105 initiates pasting of the selection of multiple characters on a respective display medium 130-2 depending on an order of selecting the multiple characters made by the selection tool 116 during the selection process.

More specifically, a respective user starts a selection at the end of a respective string of characters 415 (e.g., a sentence, paragraph, etc.) and sweeps arrow 412 from right-to-left to the beginning of string of characters 415. As discussed above, editor application 105 employs monitor function 120 to monitor a direction of arrow 412 during the selection process. In the present example, the monitor function 120 detects a right-to-left selection of the multiple characters during the selection of content. Because letters in the word "Steinbeck" are selected first, post processor function 140 initiates a respective paste function so these letters are first to appear in pasted content shown as string of characters 417. That is, the post processor function 140 pastes the selection of multiple characters in a left-to-right ordering (e.g., as string of characters 417) such that a first character in the left-to-right ordering is a first selected character (e.g., the period after the word "Steinbeck") in the right-to-left selection and a last character (e.g., the letter t in the word "The") in the left-to-right ordering is a last selected character in the right-to-left selection.

Figure 5:
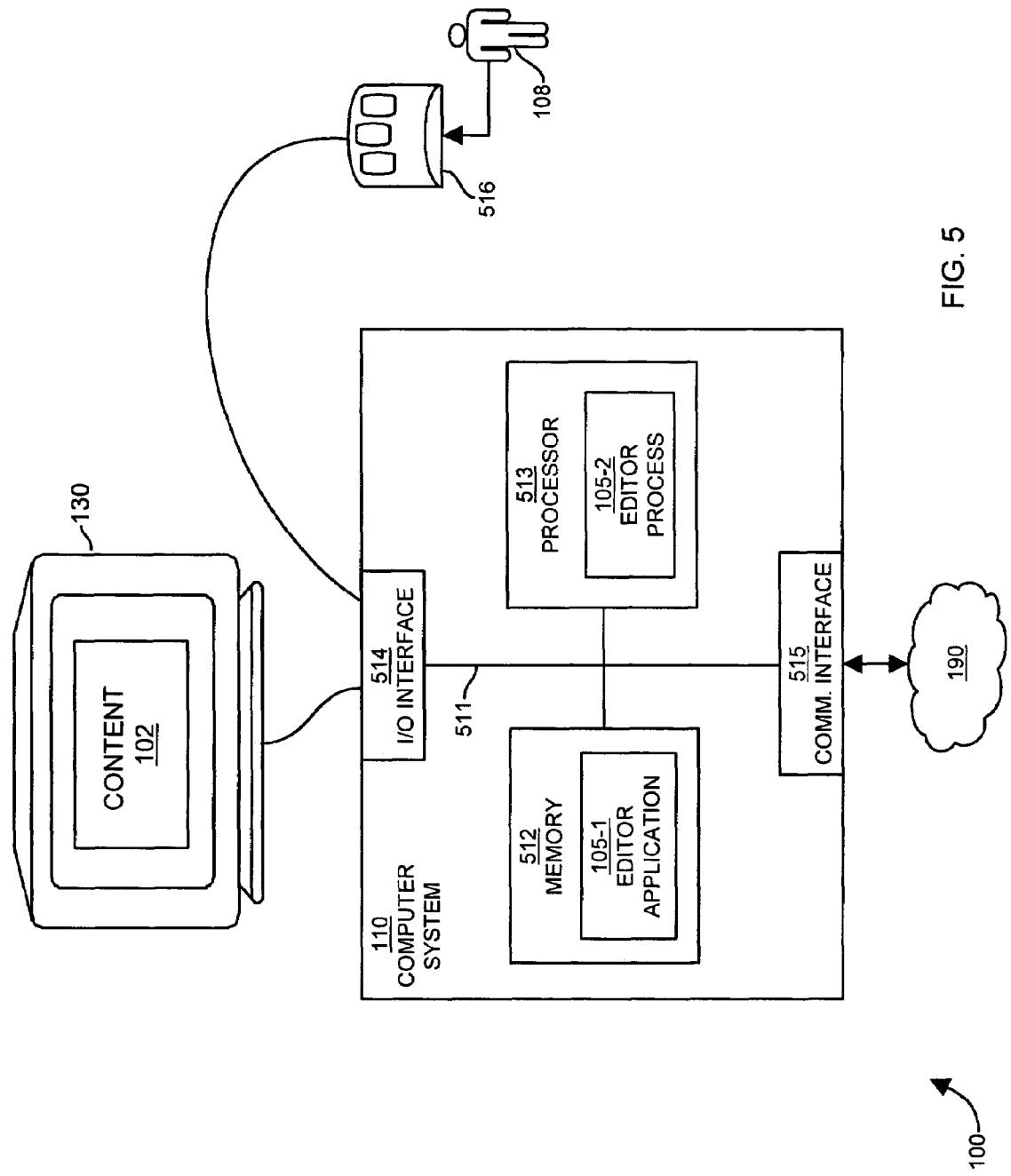
FIG. 5 is an example of a computer environment and corresponding computer system for executing an editor application according to an embodiment herein.

FIG. 5 is a block diagram of a computer environment 100 illustrating an example architecture of a respective computer system 110 for implementing editor application 105 according to embodiments herein. Computer system 110 can be a computerized device such as a personal computer, workstation, portable computing device, console, network terminal, processing device, etc.

As shown, computer system 110 of the present example includes an interconnect 511 that couples a memory system 512, a processor 513, I/O interface 514, and a communications interface 515. I/O interface 514 potentially provides connectivity to peripheral devices 516 such as a keyboard, mouse (e.g., selection tool 116), display screens (e.g., display medium 130), etc. User 108 provides input to computer system 110. Communications interface 515 enables computer system 110 to communicate over network 190 to retrieve and transmit information from remotely located sources if necessary.

As shown, memory system 512 is encoded with editor application 105-1 that supports selection and/or paste functions as discussed above and as discussed further below. Editor application 105-1 can be embodied as software code such as data and/or logic instructions (e.g., code stored in the memory or on another computer readable medium such as a disk) that supports processing functionality according to different embodiments described herein. During operation of one embodiment, processor 513 accesses memory system 512 via the use of interconnect 511 in order to launch, run, execute, interpret or otherwise perform the logic instructions of the editor application 105-1. Execution of the editor application 105-1 produces processing functionality in editor process 105-2. In other words, the editor process 105-2 represents one or more portions of the editor application 105-1 performing within or upon the processor 513 in the computer system 110.

It should be noted that, in addition to the editor process 105-2 that carries out method operations as discussed herein, other embodiments herein include the editor application 105-1 itself (i.e., the un-executed or non-performing logic instructions and/or data). The editor application 105-1 may be stored on a computer readable medium such as a floppy disk, hard disk or in an optical medium. According to other embodiments, the editor application 105-1 can also be stored in a memory type system such as in firmware, read only memory (ROM), or, as in this example, as executable code within the memory system 512 (e.g., within Random Access Memory or RAM).

In addition to these embodiments, it should also be noted that other embodiments herein include the execution of editor application 105-1 in processor 513 as the editor process 105-2. Thus, those skilled in the art will understand that the computer system 110 can include other processes and/or software and hardware components, such as an operating system that controls allocation and use of hardware resources.

Functionality supported by computer system 110 and, more particularly, functionality associated with editor application 105-1 and editor process 105-2 will now be discussed via flowcharts in FIGS. 6 and 7. For purposes of the following discussion, computer system 110 or (e.g., editor application 105-1 and/or editor process 105-2) generally performs steps in the flowcharts.

Note that there will be some overlap with respect to concepts discussed above for FIGS. 1 through 5. Also, note that the steps in the below flowcharts need not always be executed in the order shown.

Figure 6:
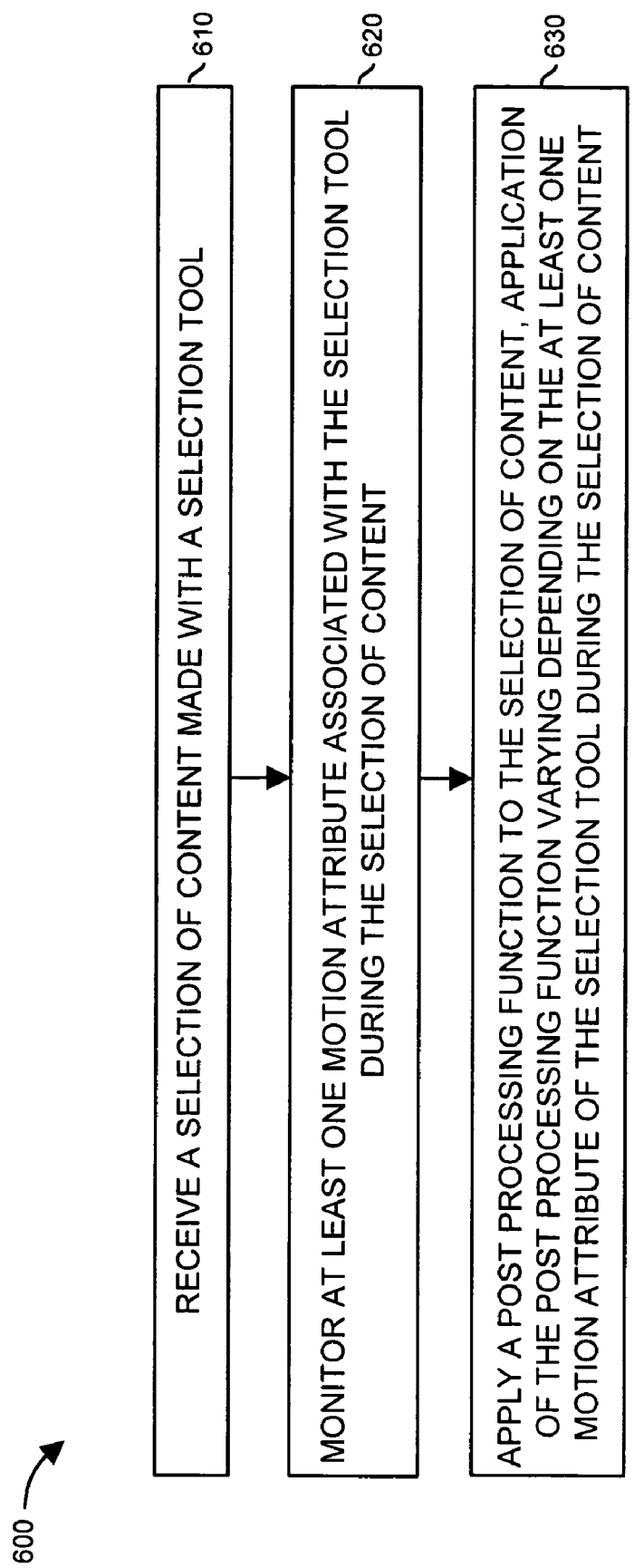
FIG. 6 is a flowchart illustrating a technique of applying a post processor function to selected content according to an embodiment herein.

FIG. 6 is a flowchart 600 illustrating a technique of carrying out selection and paste operations from the perspective of editor application 105 according to an embodiment herein. References in the flowchart 600 of FIG. 6 will be made to matter previously discussed with respect to FIGS. 1-5.

In step 610, the editor application 105 receives a selection of content made with a selection tool 116.

In step 620, the editor application 105 monitors at least one motion attribute (e.g., hand movement) associated with the selection tool 116 during the selection of content.

In step 630, the editor application 105 applies a post processing function 140 to the selection of content. Application of the post processing function varies depending on the at least one motion attribute of the selection tool 116 during the selection of content.

Figure 7:
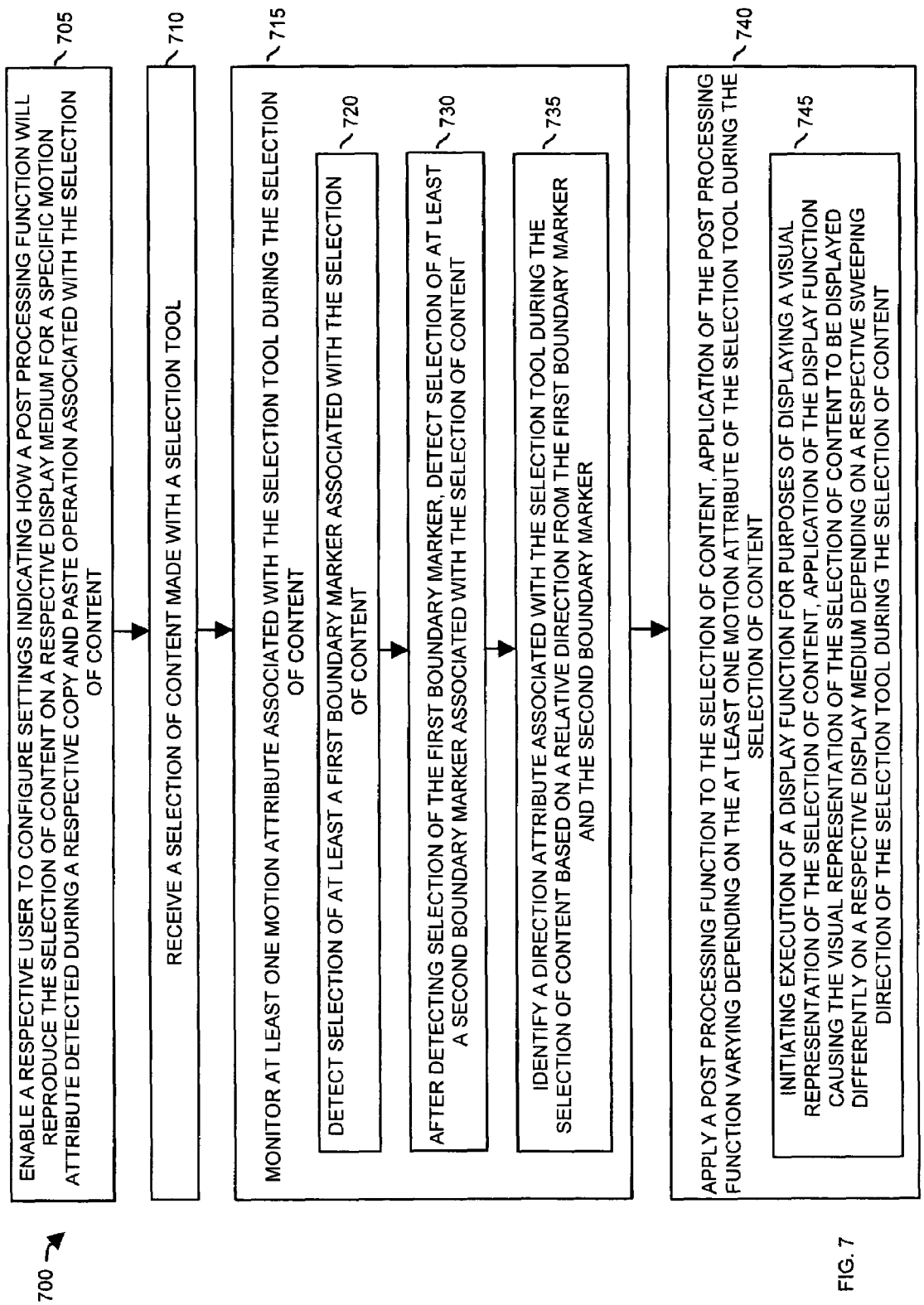
FIG. 7 is a flowchart illustrating techniques of applying a post processor function to selected content according to an embodiment herein.

FIG. 7 is a flowchart 700 illustrating more specific techniques associated with embodiments herein. Note that according to the present example embodiment, the steps in flowchart 700 are performed by editor application 105. However, the resource that executes the operational steps can vary depending on the application.

In step 705, the editor application 105 enables a respective user to configure settings (e.g., rules 160) indicating how a post processing function 140 will reproduce the selection of content on a respective display medium 130 for a specific motion attribute 125 detected during a respective select and paste operation.

In step 710, the editor application 105 receives a selection of content made with a selection tool 116.

In step 715, the editor application 105 monitors at least one motion attribute associated with the selection tool 116 during the selection of content.

In sub-step 720 of step 715, the editor application 105 detects selection of at least a first boundary marker (e.g., a start location) associated with the selection of content.

In sub-step 730 of step 715, after detecting selection of the first boundary marker, the editor application 105 detects selection of at least a second boundary marker (e.g., an end location) associated with the selection of content.

In sub-step 735 of step 715, the editor application 105 identifies a direction attribute associated with the selection tool 116 during the selection of content based on a relative direction of the selection tool 116 from the first boundary marker to the second boundary marker. As discussed above, this embodiment can be extended to include detecting a relative speed of the selection tool 116 (e.g., a user's hand) during the selection process.

In step 740, the editor application 105 applies a post processing function 140 to the selection of content. Application of the post processing function varies depending on the at least one motion attribute of the selection tool 116 during the selection of content.

In sub-step 745 of step 740, the editor application 105 initiates execution of a display function for purposes of displaying a visual representation of the selection of content. Application of the display function causes the visual representation of the selection of content (e.g., pasted content) to be displayed differently on a respective display medium depending on a respective sweeping direction of the selection tool 116 during the selection of content. For example, assume that the monitor function 120 detects a right-to-left selection of multiple symbols (e.g., text characters) during a selection of content. During a respective paste operation, the post processing function 140 displays a visual rendition (e.g., a display of the pasted content) of the selected content including the multiple symbols in a left-to-right ordering such that a first symbol in the left-to-right ordering is a first selected symbol of the right-to-left selection and a last symbol in the left-to-right ordering is a last selected symbol in the right-to-left selection. This is more specifically shown and discussed in FIG. 4 above.

Note again that techniques herein are well suited for converting selected content into different formats depending on motion attributes associated with a selection input. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
    receiving a selection of content made with a selection tool, the content displayed in an original orientation during the selection, the selection of content representing selected content;
    monitoring at least one motion attribute associated with the selection tool during the selection of content; and
    applying a post-processing function to the selected content, wherein the post-processing function varies depending upon the at least one motion attribute of the selection tool monitored during the selection of content, wherein the post-processing function further comprises: in response to a direction associated with the at least one motion attribute monitored during selection of content, orienting a reproduction of the selected content differently than the original orientation of the selected content.

2. A method as in claim 1, wherein monitoring the at least one motion attribute associated with the selection tool includes detecting movement of a computer mouse during the selection of content.

3. A method as in claim 1, wherein monitoring the at least one motion attribute includes detecting a relative speed associated with the selection tool during the selection of content.

4. A method as in claim 1, wherein monitoring the at least one motion attribute associated with the selection tool during the selection of content includes:
    detecting selection of at least a first boundary marker associated with the selection of content;
    after detecting selection of the first boundary marker, detecting selection of at least a second boundary marker associated with the selection of content; and
    identifying a direction attribute associated with the selection tool during the selection of content based on a relative direction from the first boundary marker and the second boundary marker.

5. A method as in claim 1, wherein receiving the selection of content includes receiving a selection of multiple characters on a display screen; and
    wherein applying the post-processing function includes pasting the selection of multiple characters on a respective display medium depending on an order of selecting the multiple characters made by the selection tool during the selection.

6. A method as in claim 5, wherein monitoring the at least one motion attribute associated with the selection tool includes detecting a right-to-left selection of the multiple characters during the selection of content; and
    wherein pasting the selection of multiple characters on the respective display medium results in a visual rendition of the selection of content in which the multiple characters are displayed in a left-to-right ordering such that a first character in the left-to-right ordering is a first selected character in the right-to-left selection and a last character in the left-to-right ordering is a last selected character in the right-to-left selection.

7. A method as in claim 1, wherein monitoring the at least one motion attribute associated with the selection tool includes detecting a right-to-left selection of multiple symbols during the selection of content; and
    wherein applying the post-processing function includes displaying the multiple symbols in a left-to-right ordering such that a first symbol in the left-to-right ordering is a first selected symbol of the right-to-left selection and a last symbol in the left-to-right ordering is a last selected symbol in the right-to-left selection.

8. A method as in claim 1 further comprising:
    enabling a respective user to configure settings indicating how the post-processing function will reproduce the selection of content on a respective display medium for a specific motion attribute detected during a respective copy and paste operation associated with the selection of content.

9. A method as in claim 1, wherein monitoring at least one motion attribute includes receiving direction information indicating a respective direction of the selection tool during the selection of content; and
    wherein applying the post-processing function to the selection of content includes applying a display function to display a visual representation of the selection of content, application of the display function causing the visual representation of the selection of content to be displayed differently on a respective display medium depending on the respective direction of the selection tool during the selection of content.

10. A method as in claim 9, wherein receiving the selection of content includes obtaining information associated with a portion of an image on a display screen, the portion of the image being the selection of content made by the selection tool; and wherein application of the display function causes:

i) the visual representation of the selection of content to be oriented on the respective display medium in a same manner as the portion of the image originally appeared on the display screen if the direction of the selection tool was from left to right during the selection of the content, and ii) the visual representation of the selection of content to be reoriented on the respective display medium as flipped about a vertical axis with respect to how the portion of image originally appeared on the display screen if the direction of the selection tool was from right to left during the selection of the content.

11. A method as in claim 1, wherein receiving a set of at least one motion attribute includes receiving speed information indicating a respective speed of the selection tool during the selection of the content; and wherein applying the post-processing function to the selection of content includes applying a display function to display a visual representation of the selection of content, application of the display function causing the visual representation of the selection of content to be displayed differently on a respective display medium depending on the respective speed of the selection tool during the selection of content.

12. A method as in claim 11, wherein receiving the selection of content includes obtaining information associated with a portion of an image on a display screen, the portion of the image being the selection of content made by the selection tool; and wherein application of the display function includes:

i) applying a first display function to at least one portion of the selection of content in which the respective speed of the selection tool falls within a first range during the selection of the content, and ii) applying a second display function to at least one portion of the selection of content in which the respective speed of the selection tool falls within a second range during the selection of the content.

13. A method as in claim 1, wherein receiving the set of at least one motion attribute includes receiving speed as well as direction information indicating a respective speed and direction of the selection tool during the selection of content; and wherein applying the post-processing function to the selection of content includes applying a display function to display a visual representation of the selection of content, application of the display function causing the visual representation of the selection of content to be displayed differently on a respective display medium depending on the respective speed and direction of the selection tool during the selection of content.

14. A computer program product including a computer-readable medium having instructions stored thereon for processing data information, such that the instructions, when carried out by a processing device, enable the processing device to perform the operations of:

receiving a selection of content made with a selection tool, the content displayed in an original orientation during the selection, the selection of content representing selected content;

monitoring at least one motion attribute associated with the selection tool during the selection of content; and applying a post-processing function to the selected content, wherein the post-processing function varies depending upon the at least one motion attribute of the selection tool monitored during the selection of content, wherein the post-processing function further comprises: in response to a direction associated with the at least one motion attribute monitored during selection of content, orienting a reproduction of the selected content differently than the original orientation of the selected content.

15. A computer program product as in claim 14, wherein monitoring the at least one motion attribute includes detecting a relative speed associated with the selection tool during the selection of content.

16. A computer program product as in claim 14, wherein monitoring the at least one motion attribute associated with the selection tool during the selection of content includes:

detecting selection of at least a first boundary marker associated with the selection of content;

after detecting selection of the first boundary marker, detecting selection of at least a second boundary marker associated with the selection of content; and identifying a direction attribute associated with the selection tool during the selection of content based on a relative direction from the first boundary marker and the second boundary marker.

17. A computer program product as in claim 14, wherein receiving the selection of content includes receiving a selection of multiple characters on a display screen; and wherein applying the post-processing function includes pasting the selection of multiple characters on a respective display medium depending on an order of selecting the multiple characters made by the selection tool during the selection.

18. A computer program product as in claim 17, wherein monitoring the at least one motion attribute associated with the selection tool includes detecting a right-to-left selection of the multiple characters during the selection of content; and wherein pasting the selection of multiple characters on the respective display medium results in a visual rendition of the selection of content in which the multiple characters are displayed in a left-to-right ordering such that a first character in the left-to-right ordering is a first selected character in the right-to-left selection and a last character in the left-to-right ordering is a last selected character in the right-to-left selection.

19. A computer program product as in claim 14, wherein monitoring the at least one motion attribute associated with the selection tool includes detecting a right-to-left selection of multiple symbols during the selection of content; and wherein applying the post-processing function includes displaying the multiple symbols in a left-to-right ordering such that a first symbol in the left-to-right ordering is a first selected symbol of the right-to-left selection and a last symbol in the left-to-right ordering is a last selected symbol in the right-to-left selection.

20. A computer program product as in claim 14, wherein monitoring at least one motion attribute includes receiving direction information indicating a respective direction of the selection tool during the selection of content; and wherein applying the post-processing function to the selection of content includes applying a display function to display a visual representation of the selection of content, application of the display function causing the visual representation of the selection of content to be displayed differently on a respective display medium depending on the respective direction of the selection tool during the selection of content.

21. A computer program product as in claim 20, wherein receiving the selection of content includes obtaining information associated with a portion of an image on a display screen, the portion of the image being the selection of content made by the selection tool; and wherein application of the display function causes:

i) the visual representation of the selection of content to be oriented on the respective display medium in a same manner as the portion of the image originally appeared on the display screen if the direction of the selection tool was from left to right during the selection of the content, and ii) the visual representation of the selection of content to be reoriented on the respective display medium as flipped about a vertical axis with respect to how the portion of image originally appeared on the display screen if the direction of the selection tool was from right to left during the selection of the content.

22. A computer program product as in claim 21, wherein receiving the set of at least one motion attribute includes receiving speed as well as direction information indicating a respective speed and direction of the selection tool during the selection of content; and wherein applying the post-processing function to the selection of content includes applying a display function to display a visual representation of the selection of content, application of the display function causing the visual representation of the selection of content to be displayed differently on a respective display medium depending on the respective speed and direction of the selection tool during the selection of content.

23. A computer system that supports selection and paste operations, the computer system comprising:

a processor;

a memory unit that stores instructions associated with an application executed by the processor; and an interconnect coupling the processor and the memory unit, enabling the computer system to execute the application and perform operations of:

receiving a selection of content made with a selection tool, the content displayed in an original orientation during the selection, the selection of content representing selected content;

monitoring at least one motion attribute associated with the selection tool during the selection of content; and applying a post-processing function to the selected content, wherein the post-processing function varies depending upon the at least one motion attribute of the selection tool monitored during the selection of content, wherein the post-processing function further comprises: in response to a direction associated with the at least one motion attribute monitored during selection of content, orienting a reproduction of the selected content differently than the original orientation of the selected content.

* * * * *

UNITED STATES PATENT AND TRADEMARK OFFICE
CERTIFICATE OF CORRECTION

| | | |
|---|---|---|
| PATENT NO. | : 7,461,349 B1 | Page 1 of 1 |
| APPLICATION NO. | : 11/364664 | |
| DATED | : December 2, 2008 | |
| INVENTOR(S) | : Raman Sharma and Niraj Gupta | |

It is certified that error appears in the above-identified patent and that said Letters Patent is hereby corrected as shown below:

Title page, item [56] Gilfix reference should be 2005/0138568

Signed and Sealed this

Fifth Day of January, 2010

David J. Kappos
*Director of the United States Patent and Trademark Office*